United States Patent Office 3,483,796
Patented Dec. 16, 1969

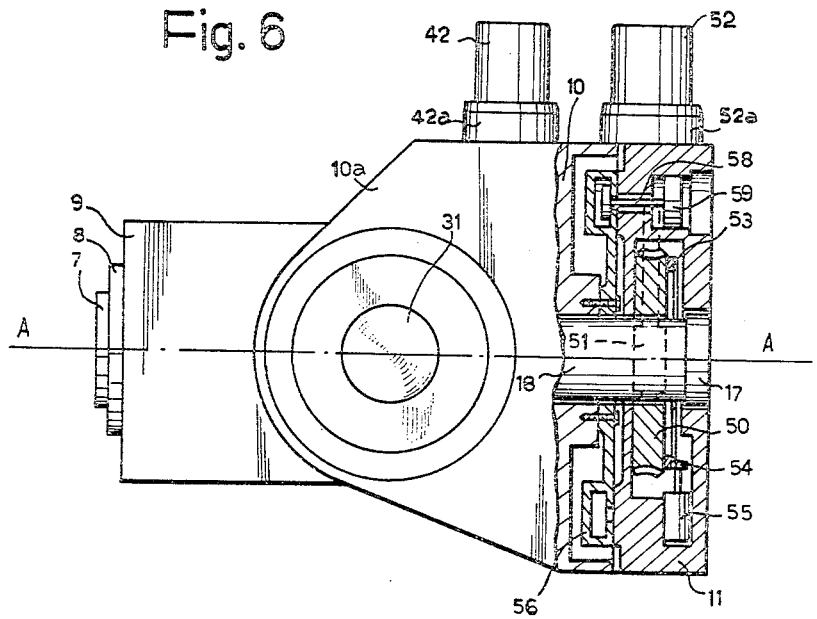
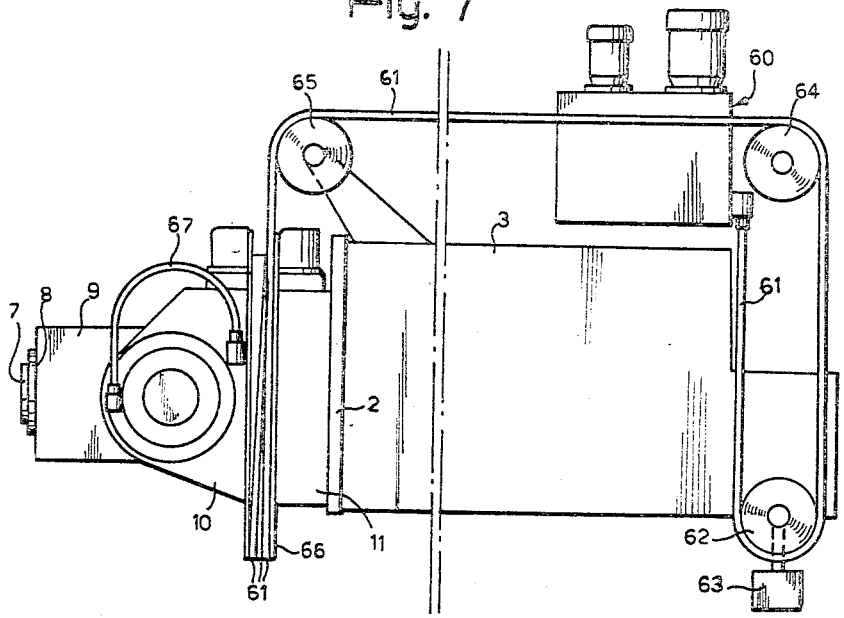

3,483,796
ANGULARLY ADJUSTABLE HEADSTOCK AT-
TACHMENT FOR USE ON MACHINE TOOLS
Maso Galbarini, Pavia, and Francesco Cotta Ramusino,
Milan, Italy, assignors to Innocenti Societa Generale
Per l'Industria Metallurgica E Meccanica, Milan, Italy,
a joint-stock company of Italy
Filed June 14, 1968, Ser. No. 737,145
Claims priority, application Italy, June 21, 1967,
52,165/67
Int. Cl. B23c 1/12; B23b 39/00
U.S. Cl. 90—17     17 Claims

ABSTRACT OF THE DISCLOSURE

An angularly adjustable headstock attachment for a machine tool such as a milling machine comprises a support adapted to be fitted to the front plate of the machine tool headstock, a yoke member mounted on the support for rotation about a longitudinal axis, a sleeve support member mounted in the yoke member for rotation about a transverse axis and a sleeve mounted within said sleeve support member for relative axial displacement longitudinally therein. A spindle is rotatably mounted within the sleeve for axial displacement therewith, and tools are mounted on the spindle in use of the attachment. Drive means are provided for transmitting rotary drive from the main machine tool spindle to said tool-supporting spindle in all orientations of the latter.

---

This invention relates to an angularly adjustable headstock attachment for use on machine tools such as milling-reaming machines.

When using milling-reaming machines it is at times necessary to machine workpieces having surfaces which are variously inclined to the axis of the man spindle of the machine. Machining in such cases is normally carried out by fitting to the headstock of the machine a different attachment for each machining operation, each attachment being such that power is transmitted from the main spindle to an auxiliary spindle carried by the attachment and inclined at the appropriate angle to the main spindle.

When carrying out machining of considerable complexity various attachments have therefore to be fitted to and removed from the machine headstock, each being positioned and locked in the headstock in turn. This tends to protract the time required for the machining operation.

The time involved in fitting, positioning and removing different headstock attachments becomes relatively more significant in machine tools having digital control, for which the time taken by the machining operations themselves is reduced compared with manually controlled machine tools.

An object of the present invention is to obviate the above drawback by providing an angularly adjustable headstock attachment adapted to be fitted to a machine tool headstock, which may be orientated in any required direction in the space extending in front of the front face of the headstock of the machine, to enable parts having differently inclined surfaces to be machined without demounting the headstock attachment.

Another object of the invention is to provide a headstock attachment of the above mentioned type, the various parts of which may be remotely controlled and the displacement of which may be monitored and supervised from a remote control station.

A further object of the invention is to provide a headstock attachment of the above mentioned type suitable for use on digitally controlled machine tools.

The headstock attachment according to the invention is characterised by a support adapted to be fitted to the front plate of a machine tool headstock, a yoke member mounted on the support for rotation about a longitudinal axis, a sleeve support member mounted in the yoke member for rotation about a transverse axis which is perpendicular to said longitudinal axis, a sleeve mounted within said sleeve support member for relative axial displacement therein in a direction perpendicular to said transverse axis, a spindle rotatably mounted within the sleeve for axial displacement therewith, respective actuator means for effecting controlled rotational displacement of the yoke member and the sleeve support member and controlled axial displacement of the sleeve and the spindle and drive means for transmitting rotary drive from a drive member adapted to connect drivingly with the machine tool headstock to drive the said spindle in all orientations of the latter.

The invention will be more clearly understood from the following description, given by way of example only, with reference to the accompanying drawings, wherein:

FIGURE 6 is a part-sectional side elevational view showing the means for rotating and locking the yoke member of said attachment; and FIGURE 7 is a diagrammatic side elevational view showing the means for supplying a pressure fluid to the control and locking means of the headstock attachment.

Figure 1:
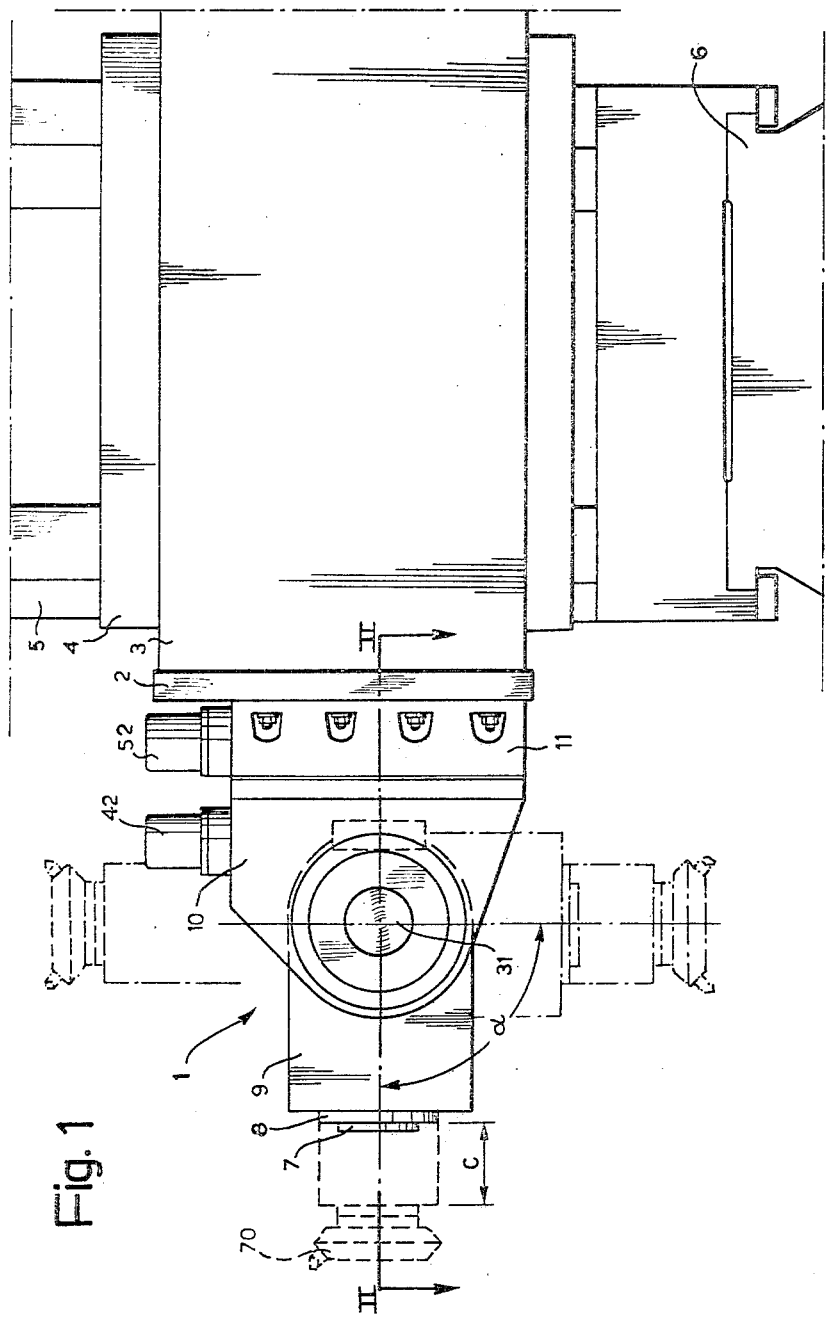
FIGURE 1 is a diagrammatic side elevational view of a reaming-milling machine having fitted thereto an angularly adjustable headstock attachment according to one embodiment of the invention.

Referring to FIGURE 1, an angularly adjustable headstock attachment 1 is adapted to be fitted to a front plate 2 of a headstock 3 of a reaming-milling machine.

The headstock 3 is slidably mounted in the conventional manner, in a carriage 4 which is vertically movable along a standard 5 capable of horizontal translational movement over fixed horizontal guideways 6 on the machine bed.

The headstock attachment 1 comprises a cylindrical sleeve 8 within which an extensible rotatable spindle 7 is coaxially disposed. A sleeve support member 9 supports the sleeve 8 for axial displacement. A forked yoke member 10 supports the sleeve support member 9 for oscillation about a transverse axis B—B, the yoke member 10 being mounted on a support plate 11 adapted to be fitted to the headstock 3 of the machine.

The yoke member 10 is capable of rotation about a horizontal longitudinal axis A—A coinciding with the axis of the main spindle 16 (shown in broken lines) of the headstock 3.

The sleeve 8 is displaceable axially over a distance C for boring, reaming and the like; the sleeve support member 9 is capable of rotation, for example, through 90°, about the transverse axis B—B, and the yoke member 10 is capable of rotation through 360° about the horizontal axis A—A. In this way it is possible to position the spindle 7, and any cutting tool 70 (shown in broken outline in FIGURE 1) supported thereon, in any orientation within the space extending in front of the machine headstock 3.

Figure 2:
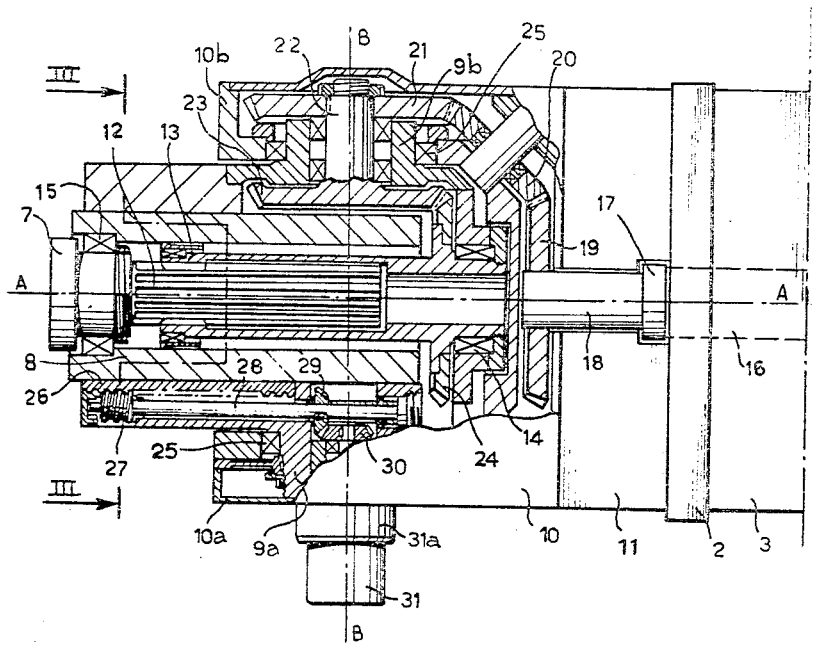
FIGURE 2 is an axial section view on line II—II of FIGURE 1.

As shown in FIGURE 2, the spindle 7 is fast with a splined shaft 12 coaxially mounted for axial displacement within a splined bushing 13 which is retained against axial movement. The rear end of the bushing 13 is supported through a bearing 14 by the sleeve support member 9, and the spindle 7 is supported through a bearing 15 within the sleeve 8, so as to be displaceable axially together with the sleeve 8.

The interengaging splines on the shaft 12 and bushing 13 serve to transmit a working rotary drive to the spindle 7 from the main spindle 16 on the machine headstock 3. To this end a clutch member 17 is fitted to the spindle 16, the clutch member 17 being fast with a shaft 18 extending through the support plate 11 and partially into the yoke member 10. Within the yoke member 10 gearing is arranged including a bevel wheel 19 secured to the shaft 18. The bevel wheel 19 transmits motion to an intermediate bevel wheel 20 which in turn transmits motion to a further bevel wheel 21 secured to a shaft 22 rotatably mounted within the sleeve support member 9 with its axis perpendicular to the axis of the shaft 18 and coinciding with the transverse axis B—B.

A further bevel wheel 23 is keyed on the shaft 22 and cooperates with a final bevel wheel 24 keyed to the splined bushing 13, the axis of the bevel wheel 24 coinciding with the longitudinal axis A—A.

Through the above described bevel gear train rotary drive to the spindle 7 from the main spindle 16 is maintained whatever the angular position of the sleeve support member 9 with respect to the yoke member 10 and whatever the angular position of the yoke member 10 with respect to the support plate 11.

The sleeve support member 9 is provided with two lateral pins 9a, 9b which are supported through the interposition of bearings 25 for rotation in two opposite walls 10a, 10b of the forked yoke member 10.

As shown in FIGURE 2, the axial displacement of the sleeve 8 and spindle 7 with respect to the sleeve support member 9 is effected by means of a longitudinally extending positioning rack 26 secured to the outside of the sleeve 8 and cooperating with a worm screw 27 keyed to a longitudinally extending shaft 28. Rotary motion is transmitted to the shaft 28 through a pair of bevel wheels 29, 30 from a hydraulic motor 31 provided with a reducing gear 31a. A precision measuring rack 32 is also arranged on the sleeve 8 parallel to the position rack 26 (FIGURE 3) and has meshing therewith a pinion 33 connected to a position-monitoring transducer 34 in order to transmit the displacements of the sleeve 8 to a remote monitoring and control station as an electrical signal.

Figure 3:
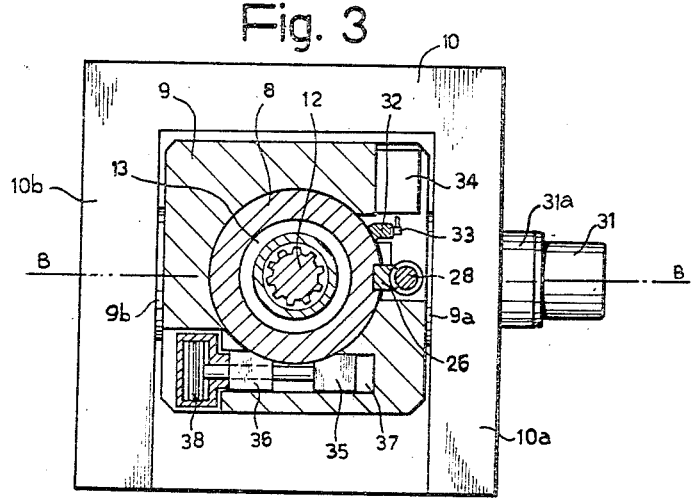
FIGURE 3 is a cross sectional view on line III—III of FIGURE 2.

The sleeve 8 may be locked in any desired axial position by pairs of movable jaws 35, 36 accommodated in recesses 37 of the sleeve support member 9. The jaws 35, 36 are movable toward each other to effect locking of the sleeve 8 by wedging engagement with the external surface thereof, and movable apart to release the sleeve 8, under control of respective fluid pressure actuators 38, one only of which is shown in FIGURE 3, the jaws 35, 36 being movable tangentially with respect to the sleeve 8.

Figure 4:
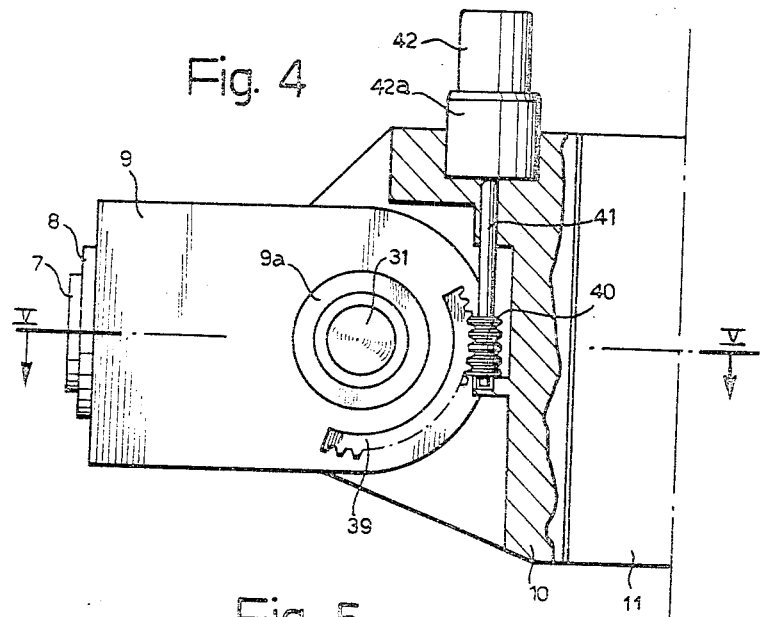
FIGURE 4 is a diagrammatic part-sectional side elevational view showing the control means for the sleeve support member of the headstock attachment.
Figure 5:
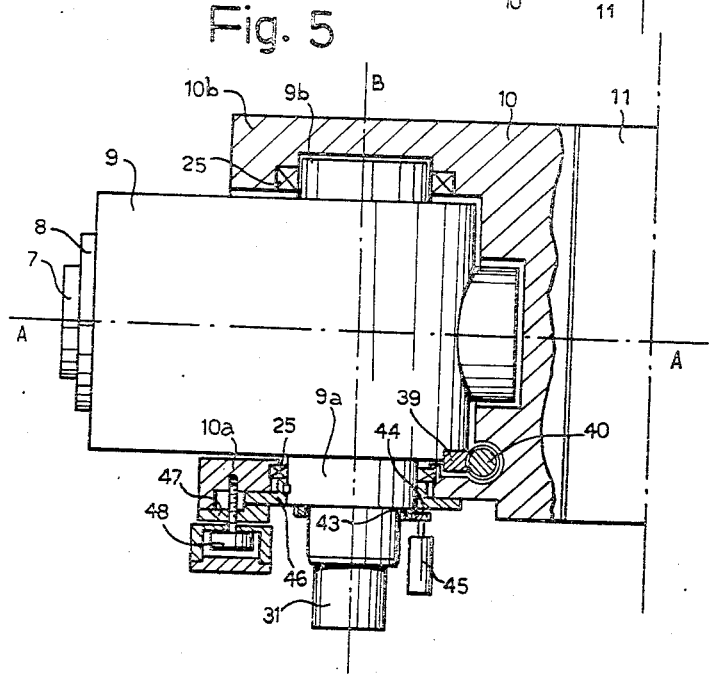
FIGURE 5 is an axial sectional view on line V—V of FIGURE 4.

Angular displacements of the sleeve support member 9 with respect to the yoke member 10 are effected, as shown in FIGURES 4 and 5, by a toothed gear sector 39 fitted to a side wall of the support member 9 concentrically with the axis B—B and having meshing therewith a worm screw 40. The worm screw 40 is keyed to a shaft 41 and driven from a hydraulic motor 42 provided with a reducing gear 42a.

A precision gear sector 43 is also secured to the support member 9 concentrically with the axis B—B and meshes with a pinion 44 connected to a position-monitoring transducer 45 which transmits electrical signals representing angular displacements of the support member 9 to the remote monitoring and control station.

In order to lock the support member 9 in preselected angular positions with respect to the yoke member 10 a plurality of fluid pressure actuators 48 (one only of which is shown) is provided. The actuators 48 act through straps 47 on a ring 46 secured to and concentric with one of the lateral pins 9a on the sleeve support member 9. The ring 46 is resiliently deformed and forced against the wall 10a of the yoke member 10, thereby frictionally locking the sleeve support member 9 upon supplying pressure fluid to the actuators 48. The yoke member 10 is connected to the support plate 11 by a crossed roller bearing (not shown) which affords maximum stability of the interconnection of these two components.

Rotation of the yoke member 10 about the horizontal axis A—A is effected by a worm wheel 50 secured to the yoke member 10 concentrically with the axis A—A and meshing with a worm 51 (indicated by broken lines) driven by an hydraulic motor 52 provided with a reducing gear 52a.

In order to lock the yoke member 10 in any desired angular position with respect to the support plate 11, a plurality of fluid pressure actuators 59 (one only of which is shown in FIGURE 6) is provided. Each actuator 59 has a rod 58 which passes through the support plate 11 and through a respective aperture in a ring 56 which is fast with the yoke member 10, the rod 58 having an enlarged head. Upon supplying pressure fluid to the actuators 59 the ring 56 is resiliently deformed by the rods 58 into frictional engagement with the support plate 11, thereby locking the plate 11 and yoke member 10 together.

A precision toothed rim 53 is secured to and concentric with the worm wheel 50 and cooperates with a pinion 54 connected to a position transducer 55 which transmits electrical signals representative of the angular position of the yoke member 10 to the central monitoring and control station.

The various hydraulic motors, 31, 42, 52 which effect the displacement of the movable parts of the headstock attachment, and the respective fluid pressure actuators 38, 48, 59 which effect locking of said parts, are remotely controlled from a central control unit 60 (FIGURE 7) situated on the headstock 3 of the machine. The control unit 60 includes a fluid, preferably oil, reservoir and pumps adapted to supply the fluid under pressure to the respective motors 31, 42, 52 and actuators 38, 48, 59. The distribution of the pressure fluid to the respective motors and actuators is controlled by suitable electrovalves and servovalves, which are remotely controlled at said remote control station by an operator or by a programmed automatic control system, for example a digital control system.

Conveniently where the pressure fluid is oil, the same oil is used to lubricate the moving parts of the attachment. A suction pump may be arranged on the support plate 11 for draining oil from various collecting points in the attachment and returning it to the reservoir.

The central fluid pressure control unit 60 is connected with the yoke member 10 by a plurality of flexible supply and return hoses 61. The hoses 61 are arranged in the form of a tackle passing from the unit 60 over a vertically movable pulley 62 provided with a counterweight 63, thence over two upper stationary pulleys 64, 65 and around a grooved drum 66 fast with the yoke member 10.

The hoses 61 are anchored to the drum 66, together with electric cables associated with the respective transducers 34, 45, 55. The pulley arrangement of the flexible hoses 61 constitutes in effect an extensible fluid pressure connection, permitting rotations of the yoke member 10 by lifting and lowering the pulley 62. The yoke member 10 is in turn connected by further flexible hoses 67 (one only of which is shown) to the motor 31 and actuators 38.

It will be apparent that the headstock attachment described above makes it possible to machine a workpiece by means of tools 70 mounted on the spindle 7 along axes extending in any desired direction without replacing the headstock attachment.

The various components of the headstock attachment described above may as stated previously, be controlled from a centralised remote monitoring and control station from which the displacements of the components may be visually monitored and controlled, for example by digital controls.

What is claimed is:

1. Angularly adjustable machine tool headstock attachment comprising in combination:
   (i) a support having means to be connected to the front plate of a machine tool headstock;
   (ii) a yoke member rotatably mounted on the support for rotation about a longitudinal axis;
   (iii) a sleeve support member pivotally mounted in the yoke member for rotation about a transverse axis which is perpendicular to said longitudinal axis;
   (iv) a sleeve slidably mounted within said sleeve support member for relative axial displacement therein in a direction perpendicular to said transverse axis;
   (v) a spindle rotatably mounted within the sleeve and axially displaceable therewith;
   (vi) respective automatic actuator means for providing controlled rotational displacement of the yoke member and the sleeve member and controlled axial displacement of the sleeve respectively, and
   (vii) drive means including a drive member for drivingly connecting a main spindle in the machine tool headstock with said first mentioned spindle for driving the latter in all orientations thereof.

2. Headstock attachment as claimed in claim 1 including respective locking means effective to lock the yoke member relative to the support, the sleeve support member relative to the yoke member, and the sleeve relative to the sleeve support member, respectively.

3. Headstock attachment as claimed in claim 2 in which the respective actuator means and the locking means are remotely controllable.

4. Headstock attachment as claimed in claim 1 including respective measuring devices effective to measure the amount of the displacements of the yoke member, the sleeve support member and the sleeve.

5. Headstock attachment as claimed in claim 1 in which the actuator means effecting axial displacement of the sleeve relative to the sleeve support member comprises an axially extending rack secured to the outer surface of the sleeve, a worm screw co-operating with said rack, and a respective motor drivingly connected to said worm screw.

6. Headstock attachment as claimed in claim 2, in which the locking means locking the sleeve relative to the sleeve support member comprise at least one jaw movable transversely in the sleeve support member selectively into and out of frictional clamping engagement with the sleeve and a respective fluid pressure actuator connected to said jaw for effecting said movement.

7. Headstock attachment as claimed in claim 4, in which the respective measuring device associated with the sleeve and the sleeve support member comprises a precision measuring rack mounted externally on the sleeve and extending parallel to the axis thereof, a gear meshing with the rack and a position-monitoring electro-mechanical transducer drivingly connected to said gear.

8. Headstock attachment as claimed in claim 1, in which the actuator means effecting angular displacement of the sleeve support member relative to the yoke member comprise a toothed sector mounted on the sleeve support member concentrically with said transverse axis, a worm screw meshing with said toothed sector and a respective motor drivingly connected to said worm screw.

9. Headstock attachment as claimed in claim 2, in which the locking means locking the yoke member relative to the support comprise a resilient ring secured to the support and concentric with said transverse axis, and a plurality of fluid pressure actuators engageable with said ring to force the ring into frictional engagement with the yoke member.

10. Headstock attachment as claimed in claim 4, in which the respective measuring device associated with the sleeve support member and the yoke member comprises a precision toothed sector attached to the sleeve support member concentrically with said transverse axis, a gear meshing with said sector and a respective electro-mechanical position-monitoring transducer drivingly connected to said gear.

11. Headstock attachment as claimed in claim 1 in which the actuator means rotating the yoke member relative to the support about said longitudinal axis comprises a worm wheel secured to the yoke member concentrically with said longitudinal axis, a worm screw meshing with said worm wheel, and a respective motor mounted on said support and drivingly connected to said worm screw.

12. Headstock attachment as claimed in claim 2, in which the respective locking means locking the yoke member with respect to said support comprise a resilient ring secured to the yoke member and concentric with said longitudinal axis and a plurality of fluid pressure actuators mounted on the support and engageable with said ring to force the latter into frictional engagement with the support.

13. Headstock attachment as claimed in claim 4, in which the respective measuring device associated with the yoke member and the support comprises a precision toothed rim secured to the yoke member concentrically with the said longitudinal axis, a toothed wheel meshing with said rim and an electro-mechanical position-monitoring transducer drivingly connected to said toothed wheel.

14. Headstock attachment as claimed in claim 1, in whch the drive means comprise a shaft adapted to be coupled to the main spindle of the machine tool and a bevel gear train having respective bevel gears mounted on the yoke member and on the sleeve support member and including a drive input bevel gear mounted on said shaft.

15. Headstock attachment as claimed in claim 14, in which the drive means further comprise a final bevel gear of said bevel gear train, a bushing secured to said final bevel gear and a splined connection between the bushing and the said spindle permitting relative axial movement of the latter.

16. Headstock attachment as claimed in claim 1 and claim 2, in which the actuator means and locking means are fluid-pressure-operated, and including a central control unit, flexible hoses connecting said control unit to said actuator means and locking means, a vertically movable weighted pulley and fixed pulleys over which said hoses pass and a grooved drum provided on the yoke member, to which drum said hoses are anchored, permitting fluid pressure connections to the actuator means and locking means in all orientations of the yoke member.

17. Headstock attachment as claimed in claim 1 in which said first mentioned spindle is connected coaxial with said main headstock spindle.

References Cited
UNITED STATES PATENTS

| | | | |
|---|---|---|---|
| 2,310,870 | 2/1943 | Retterath | 90—17 |
| 2,349,004 | 5/1944 | Richards | 90—17 |
| 2,445,039 | 7/1948 | Rusnok | 90—17 X |

GIL WEIDENFELD, Primary Examiner

U.S. Cl. X.R.

77—31; 90—16